C. F. DEITRICK.
MITER MACHINE.
APPLICATION FILED MAY 9, 1912.
1,048,447.
Patented Dec. 24, 1912.
3 SHEETS—SHEET 1.
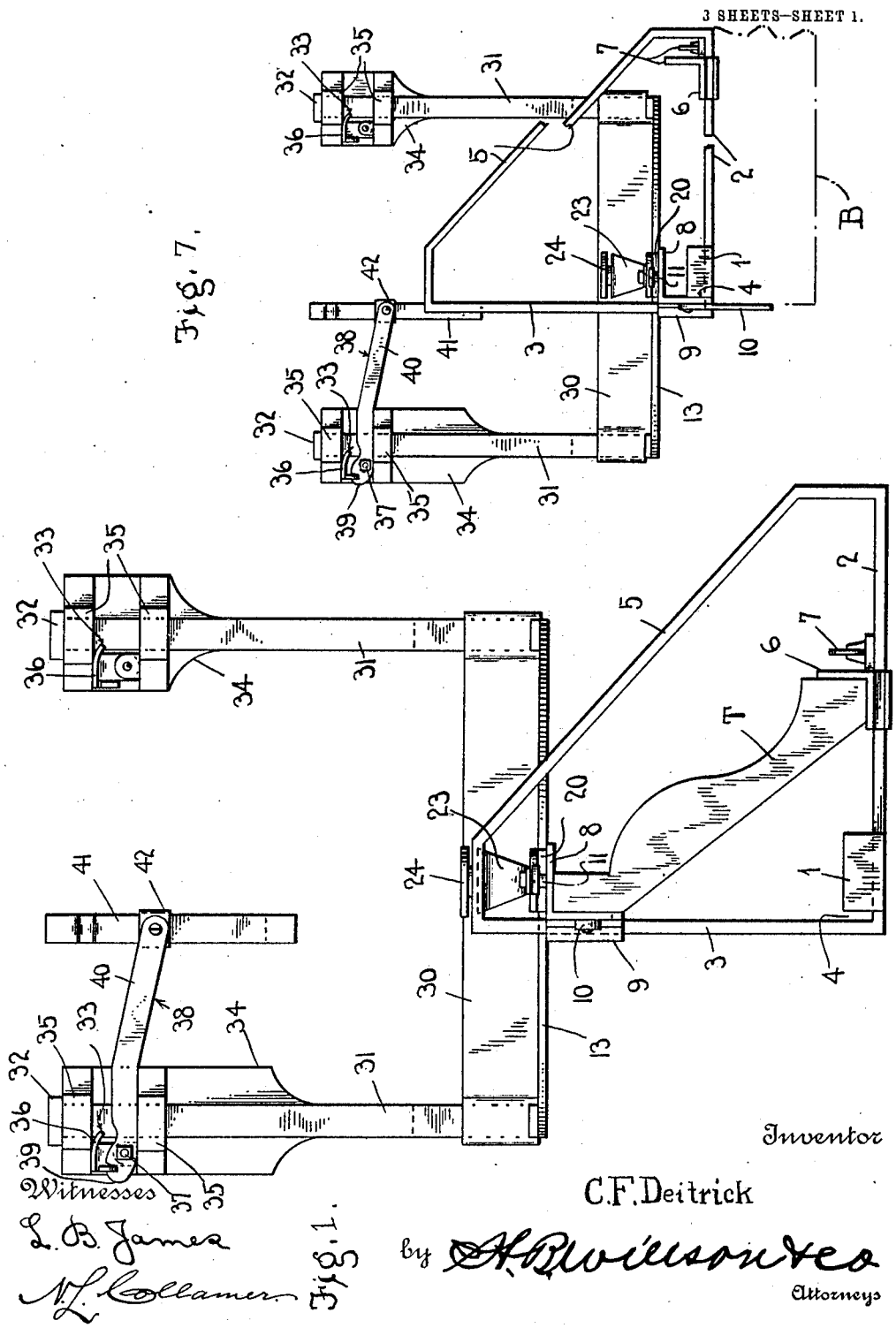
Inventor
C. F. Deitrick
Witnesses
L. B. James
N. L. Collamer
by H. D. Willson & Co.
Attorneys

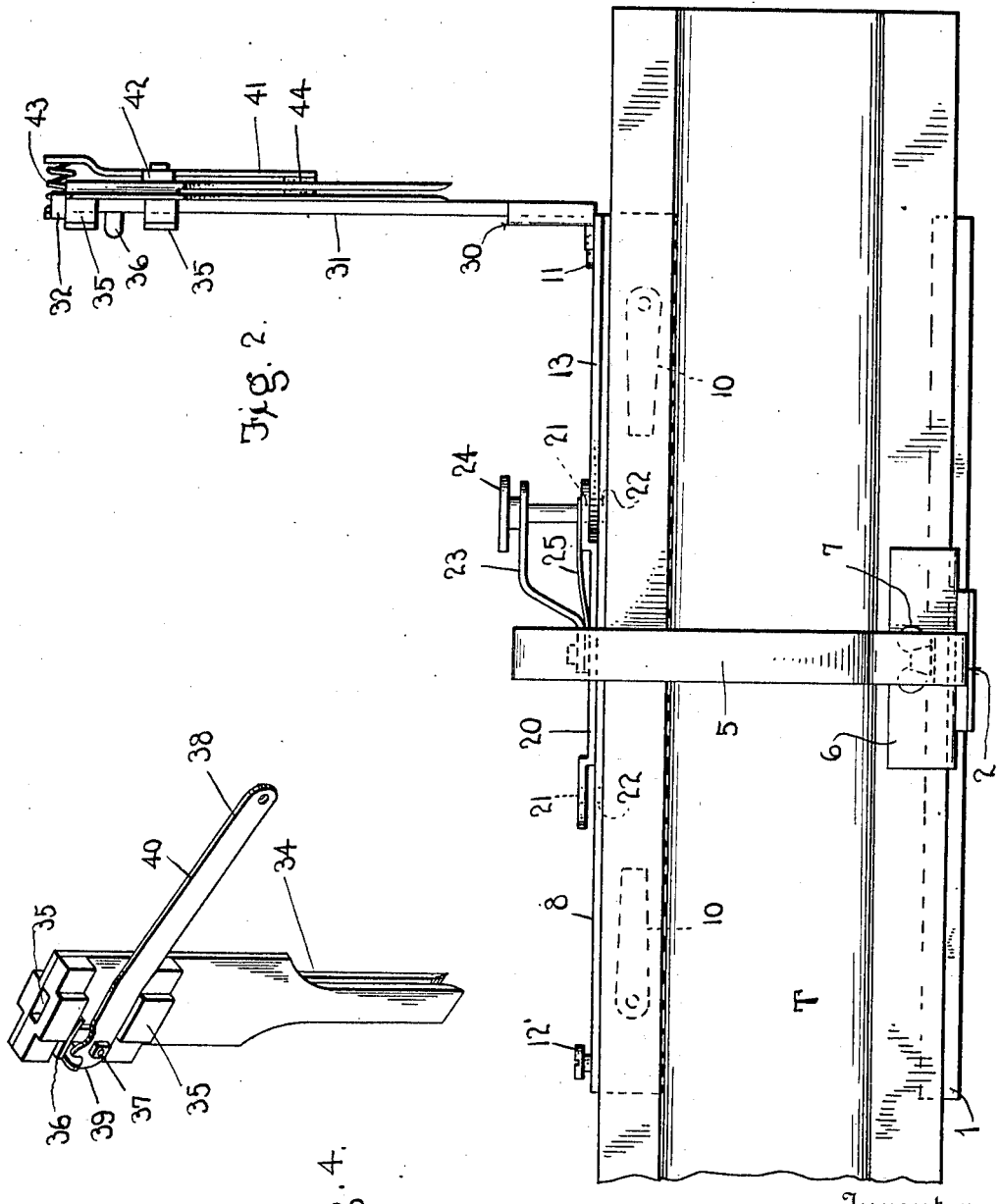

C. F. DEITRICK.
MITER MACHINE.
APPLICATION FILED MAY 9, 1912.
1,048,447.
Patented Dec. 24, 1912.
3 SHEETS—SHEET 3.
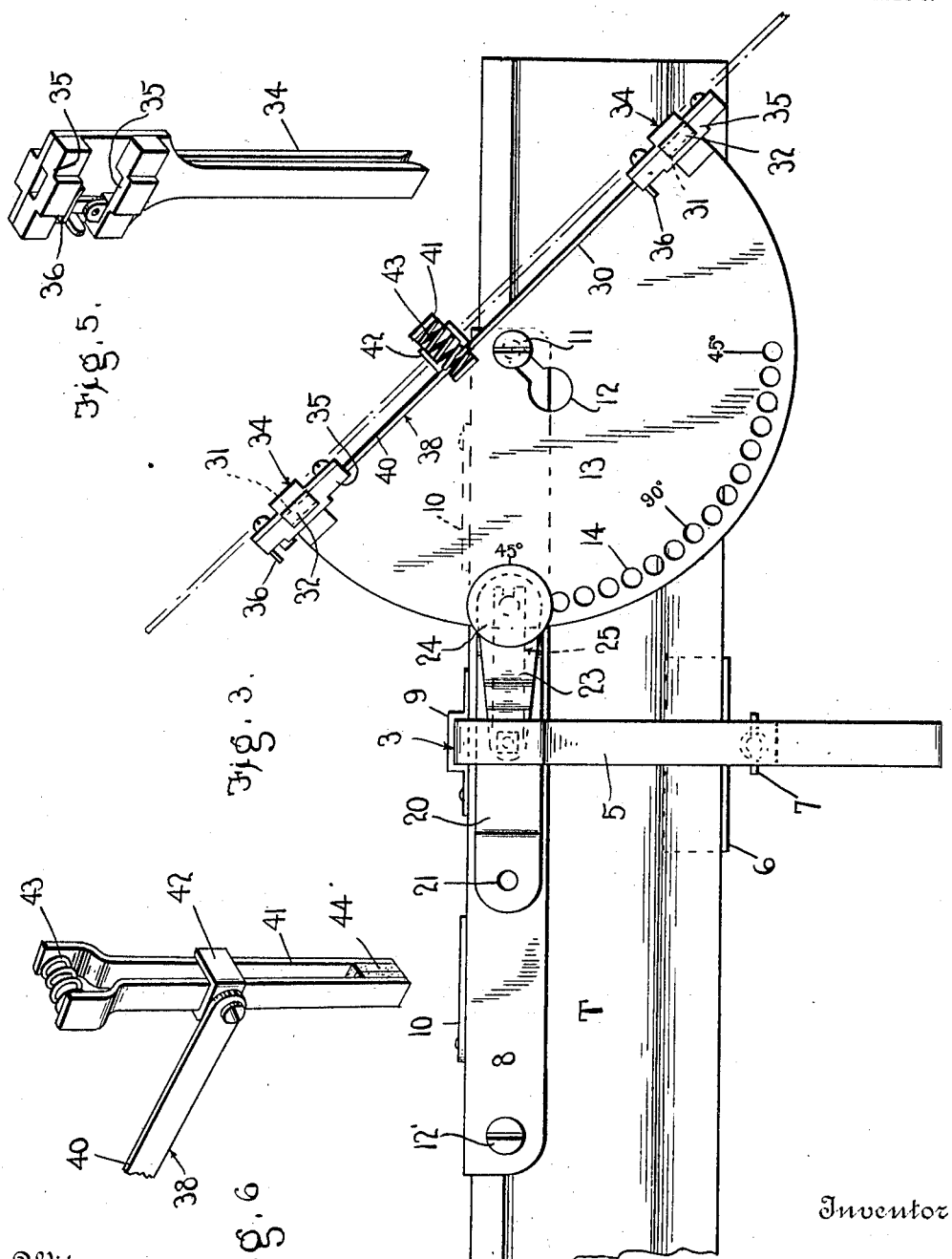
Witnesses
L. B. James
N. L. Clamer
Inventor
C. F. Deitrick
by H. B. Willson & Co.
Attorneys

UNITED STATES PATENT OFFICE.

CHARLES F. DEITRICK, OF BERWICK, PENNSYLVANIA.

MITER-MACHINE.

1,048,447.  Specification of Letters Patent.  Patented Dec. 24, 1912.

Application filed May 9, 1912. Serial No. 696,186.

*To all whom it may concern:*

Be it known that I, CHARLES F. DEITRICK, a citizen of the United States, residing at Berwick, in the county of Columbia and State of Pennsylvania, have invented certain new and useful Improvements in Miter-Machines; and I do declare the following to be a full, clear, and exact description of the invention, such as will enable others skilled in the art to which it appertains to make and use the same.

This invention relates to wood sawing, and more especially to miters; and the object of the same is to produce an adjustable miter box having a swinging saw guide capable of being set at any desired angle to the work, and means for mounting the work either within the machine or alongside the same if it be too large to pass through the loop for ordinary trim. These and other objects are carried out by the construction hereinafter more fully described and claimed, and as shown in the drawings wherein—

Figure 1 is an end elevation and Fig. 2 a side elevation of this machine complete; Fig. 3 is a plan view, showing the parts adjusted to cut a piece of trim at an angle of forty-five degrees; Figs. 4 and 5 are perspective details of the two saw guides, and Fig. 6 a perspective detail of the saw clamp; Fig. 7 is an end elevation on a reduced scale, showing the parts of this improved miter box in position to be adapted for use in connection with a flat board.

The base of this machine is made up of a bar 1 about twelve inches in length, notched across its lower edge at its center, and a substantially triangular loop of metal whose lower stretch 2 is riveted through said notch, whose upright stretch or arm 3 rises beyond the edge of the bar 1 leaving a space 4 between them for a purpose to appear below, and whose oblique stretch or arm 5 connects the outer ends of the other two arms. On said lower stretch or arm 2 is adjustably mounted a work clamp 6 by means of a set screw 7 so that it may be set against the lower outer edge of a piece of trim T when the latter is to be cut by the use of this machine. On the upright stretch or arm 3 is movably mounted a member 8 of L-shaped cross section, held to the arm 3 by means of a loop 9, and the lower flange of said member 8 is adapted to pass into the space 4 between the arm 3 and base bar 1 when this member is depressed to its fullest extent. Legs 10 pivoted to said member may be turned down at that time, and may rest against the edge of a board B or other wide object which it is desired to cut with this machine. On the other hand, when the machine is used for cutting trim, the upper edge of the same rests within the angle of the member 8 as seen in Fig. 1, and the weight of this member and the parts which it carries causes it to clamp the trim in the manner therein shown.

Associated with the work holder thus described is the saw guide which is mounted upon what might be called the front end of the L-shaped member 8. Rising from the latter is a headed stud 11 adapted to removably engage a key-hole slot 12 formed in a sector-shaped plate 13 having a series of holes 14 formed in its body around its curved edge and struck in a semi-circle around the small end of the key-hole opening 12 which is rotatably mounted upon the shank of the headed stud 11. When the saw-guide is to be detached from the remainder of the machine, it is slipped along on the stud until the larger end of the key-hole opening may be passed over the head of the stud and removed therefrom; at other times the parts assume the position shown in the drawings. I might here say that for left-handed people the headed stud may be duplicated at the other end of the L-member as shown at 12' and of course the sector plate can be attached to this stud as well as to the one with which it is shown engaged. Secured upon the center of the upper web of the L-shaped member 8 is a strap iron 20 having its extremities upbent a little and pierced with holes 21 registering with similar holes 22 in the member 8, and centrally pivoted upon the strap 20 is a bracket 23 having a guide in its outer end through which moves a headed pin 24 borne normally downward by means of a spring 25. The construction is such that the tip of this pin is adapted to be projected through a pair of the alined holes in the strap and in the member 8, or it may be lifted by grasping its head between the thumb and finger; and the holes 14 in the sector-plate 13 come under this pin as the plate is turned around its center which is the headed stud as described above. By this means the straight edge of the sector plate may be adjusted at any desired angle to the length of the member 8, and held in adjustment by means of the headed pin, and these remarks apply whether the plate is mounted over the headed stud at one of the member or the other. The straight edge of said sector-plate is upturned into a flange 30, from each end of which rises a standard 31 having a head 32 at its upper extremity and a notch 33 in its edge. Mounted on each standard is a saw guide 34 consisting of a pair of fingers connected at their upper ends in a head having loops 35 slidably embracing said standard, and between the loops is a catch 36 adapted to engage said notch so as to hold the saw guide elevated. When the catch is disengaged therefrom, the guide may slip downward along the standard in a manner which will be clear. Pivoted at 37 to one of said heads is a lever 38 whose short arm 39 engages the catch on that head so that when its inner or longer arm 40 is raised the catch is disengaged from its notch, but when the inner or longer arm is depressed the catch is held in engagement with the notch. The inner end of this lever carries a saw clamp composed of a pair of fingers 41 suitably mounted in a frame 42 and pressed apart at their upper ends by means of a spring 43 so that their lower cushioned ends 44 are thrown normally toward each other and will clamp the saw blade between them when it is not in use. But when the saw is in use it is raised slightly so that the lever disengages the catch from the notch on this standard and—the other catch being also disengaged from the notch on its standard— the saw may then be reciprocated through the two guides and its cutting edge will pass by the flange 30 and will cut the work where it projects beyond the end of the member 8 and base 1.

The operation of this machine will now be easily understood. When a piece of trim or other narrow piece of wood is to be cut, it is preferably inserted through the loop with its upper edge grasped under the L-shaped member 8 and its lower edge grasped by the work-clamp 6 which is set forward and held by set-screw 7. The headed pin is then raised and the sector-plate turned until the proper hole 14 may be engaged by the pin so as to hold the flange at the desired angle to the base. Thereafter the saw is released from the saw clamp and reciprocated through the saw guides which descend with the blade under their own weight, and the teeth cut the work in a manner which will be clear. When a larger piece of material is to be cut by this improved machine, it cannot of course be put through the loop which is by preference made of a size to receive the ordinary trim with which a building is fitted. In that event the L-shaped member is permitted to descend upon the upright arm of the loop, the legs 10 are turned downward and laid against the edge of the board B, and the end of the latter is permitted to project past the base. The sector-plate being then set at the desired angle to the length of the plate, the cutting is done in the manner above described.

A striking feature of this invention is its extreme simplicity and lightness. Its parts may be disconnected and the whole carried in the workman's tool kit. It may be used across the knee, across a saw-horse, on the bench, or in almost any position; and I have described the manner in which it may be reversed so that it can be used for external or internal use.

The proportions and materials of parts are not essential, and details may be changed as long as the spirit of the invention is retained.

What is claimed as new is:

1. In a miter machine, the combination with a base comprising a bar, and a triangular loop whose lower arm is secured across said bar; of a work-holder including a clamp movably mounted on the lower arm of said loop, means thereon for setting it in adjusted position, and a member of L-shaped cross section slidably mounted on the upright arm of said loop; and the saw guide carried by said member.

2. In a miter machine, the combination with a base comprising a bar, and a triangular loop whose lower arm is secured across said bar; of a work-holder including a clamp adjustably mounted on the lower arm of said loop, and a member of L-shaped cross section slidably mounted on the upright arm of said loop, and legs pivotally mounted on said member and adapted to be turned downward from the same so as to pass across the edge of the bar, for the purpose set forth; and the saw guide carried by said member.

3. In a miter machine, the combination with a base comprising a bar and a triangular loop whose lower arm is secured across said bar, and a work-holder including members movably mounted on the upright and lower arms of said loop; of a headed stud rising from each end of the uppermost of said members, a vertically movable pin carried by its mid-length, a sector-plate having holes around its curved edge adapted to be engaged by said pin and a key-hole slot near the center of its straight edge adapted to be engaged over either of said studs, and the saw-guides carried by said plate.

4. In a miter machine, the combination with a base comprising a bar and a triangular loop whose lower arm is secured across said bar, and a work-holder including members movably mounted on the upright and lower arms of said loop; of a headed stud rising from each end of the uppermost of said members, a strap-iron member secured to its mid-length and having its extremities upbent and perforated, a bracket pivotally mounted on the center of said member, a pin movable vertically through the outer end of the bracket and through either of said perforations, a sector plate having a key-hole slot near the center of its straight edge adapted to be mounted on either headed stud and holes around its curved edge adapted to be engaged by said pin, and the saw guides carried by said plate.

5. In a miter machine, the combination with a base, a triangular loop whose lower arm is secured across said base, a work-clamp adjustably mounted on the lower arm of said loop, and a member of L-shaped cross section slidably mounted on the upright arm thereof and coacting with said clamp to hold the work; of a sector-plate pivoted on one end of said member, means for adjusting the angle of its straight edge to such member, and the saw-guides carried by said plate.

6. In a miter machine, the combination with a base, a triangular loop whose lower arm is secured across said base, a work-clamp adjustably mounted on the lower arm of said loop, and a member slidably mounted on the upright arm thereof and coacting with said clamp to hold the work; of a stud rising from each end of said member, a sector-plate having an opening at the center of its straight edge capable of being mounted on either of said studs, means carried by the mid-length of said member for engaging the curved edge of said plate when mounted on either stud whereby the angle of its straight edge to said member may be adjusted, and the saw guides rising from said straight edge.

7. In a machine of the class described, the combination with a plate and standards rising therefrom and having notches near their upper ends, of a saw guide for each standard comprising parallel fingers and a head having loops movably mounted on the standard, a latch pivoted to said head and adapted to engage the notch in the standard, a lever pivoted between its ends to one standard with its short arm holding said latch engaged with the notch in the standard when its long arm lies across the lowermost of said loops, and a saw-clamp pivoted to the inner end of said long arm and standing between said standards.

8. In a machine of the class described, the combination with a plate and standards rising therefrom and having notches near their upper ends, of a saw guide for each standard comprising a head movably mounted on the standard and parallel pendant fingers, a latch pivoted to said head and adapted to engage the notch in the standard, a lever pivoted to one standard with its short arm engaging said latch, and a saw-clamp carried by the longer arm of this lever, for the purpose set forth.

In testimony whereof I have hereunto set my hand in presence of two subscribing witnesses.

CHARLES F. DEITRICK.

Witnesses:
 HELEN J. FREAS,
 CHARLES C. EVANS.

---

Copies of this patent may be obtained for five cents each, by addressing the "Commissioner of Patents, Washington, D. C."